United States Patent [19]

Wilson et al.

[11] Patent Number: 4,530,955
[45] Date of Patent: Jul. 23, 1985

[54] WATER TREATMENT COMPOSITION COMPRISING A HYDROLYZED MALEIC ANHYDRIDE COPOLYMER AND A ZINC COMPOUND

[75] Inventors: David Wilson, Tyldesley; John A. Reverter, Pendleton, both of England

[73] Assignee: Ciba-Geigy Corporation, Ardsley, N.Y.

[21] Appl. No.: 594,149

[22] Filed: Mar. 28, 1984

[30] Foreign Application Priority Data

Apr. 8, 1983 [GB] United Kingdom ............... 8309573

[51] Int. Cl.$^3$ .......................... C02F 5/08; C23F 11/08
[52] U.S. Cl. .................................. 524/434; 252/180; 252/181; 252/389 R; 422/17; 524/549
[58] Field of Search ................. 524/549, 434; 252/389 R, 180, 181; 422/17

[56] References Cited

U.S. PATENT DOCUMENTS

| | | | |
|---|---|---|---|
| 3,897,209 | 7/1975 | Harris et al. | 422/17 |
| 3,963,636 | 6/1976 | Harris et al. | 252/181 |
| 4,018,702 | 4/1977 | Boffardi et al. | 252/180 |
| 4,085,060 | 4/1978 | Vassileff | 524/238 |
| 4,089,796 | 5/1978 | Harris et al. | 422/14 |
| 4,126,549 | 11/1978 | Jones et al. | 422/16 |
| 4,163,733 | 8/1979 | Buckman et al. | 252/180 |
| 4,189,416 | 2/1980 | Williams | 524/549 |
| 4,209,398 | 6/1980 | Ii et al. | 252/181 |
| 4,243,564 | 1/1981 | Mavis | 525/54.26 |
| 4,351,796 | 9/1982 | Marshall | 106/14.12 |
| 4,361,669 | 11/1982 | Evans et al. | 524/549 |
| 4,390,670 | 6/1983 | Walinsky | 524/549 |

FOREIGN PATENT DOCUMENTS 0093508 11/1983 European Pat. Off. .
2643422 3/1978 Fed. Rep. of Germany .

OTHER PUBLICATIONS

Derwent Abstract 25849D/15 (EP-25979) 4-1981.
Derwent Abstract 25948Y/15 (J52027033) 3-1977.
Derwent Abstract 09163B/05 (J53146279) 12-1978.

*Primary Examiner*—Herbert J. Lilling
*Attorney, Agent, or Firm*—Harry Falber

[57] ABSTRACT

A composition for inhibiting the corrosion and scale forming tendencies of water or an aqueous system comprises 2.5 to 80% by weight of zinc (calculated as $Zn^{++}$) and from 97.5 to 20% by weight of a hydrolyzed copolymer of maleic anhydride with a monoethylenically unsaturated monomer or a mixture of monomers, the molar ratio of maleic anhydride to the total of other monomers being from 1:1 to 100:1, the molecular weight of the copolymer being up to 1000.

7 Claims, No Drawings

WATER TREATMENT COMPOSITION COMPRISING A HYDROLYZED MALEIC ANHYDRIDE COPOLYMER AND A ZINC COMPOUND

The present specification relates to a composition for the treatment of water or aqueous systems and to a process of treating water.

In very general terms, water and aqueous systems can be divided into two categories, those which may be said to be scale-forming and those which may be said to be corrosive. If a water is scale-forming, it will tend to deposit scale on metal heat-transfer surfaces in contact with it; such a water will not normally be corrosive, but in any case the scale deposited will protect the metal to some extent from corrosive attack. If a scale-forming water is treated in such a way as to alter its properties, for example by change of pH, then it may well become corrosive. In most cases, therefore, additives for water treatment tend to fall under the heading of anti-scalants or corrosion inhibitors. Some waters or aqueous systems however are both scale-forming and corrosive, and there is thus a need for an additive treatment which reduces both scale-formation and corrosive attack.

One type of anti-scaling additive is known as a threshold agent; such agents are products which can be added to water or aqueous systems in very small quantities, very much less than stoichiometric quantities, and which then cut down the rate at which insoluble salts are formed and also modify their nature so that they do not deposit so readily as adherent scale in processes involving heat-transfer. Furthermore, when any such scale is formed it is easily removeable from heat-transfer surfaces by mechanical means. A number of additives have been proposed for addition to water or aqueous systems in this way, among them certain polyphosphates and polycarboxylic acids, such as polyacrylic acid, polymethacrylic acid, hydrolysed polymaleic anhydride and hydrolysed copolymers of maleic anhydride with a mono-ethylenically unsaturated monomer or a mixture of monomers, the molar ratio of maleic anhydride to the total of the other monomers being from 2.5:1 to 100:1.

Combinations of some threshold agents with sources of zinc ions, such as zinc salts have been proposed to reduce both scale formation and the corrosive attack of water or aqueous systems on metal surfaces. Such combinations have been based on polyphosphates, organic phosonic acids and, as described in British Patent Specification No. 1 374 270, hydrolysed polymaleic anhydride. Another proposed combination is a polymer, of molecular weight 1000 to 10000, and zinc molybdate, the polymer being poly(acrylic acid), poly(methacrylic acid) or a copolymer of acrylic or methacrylic acid with maleic or fumaric acid.

We have now surprisingly found that a synergistic effect is produced if a hydrolysed copolymer of maleic anhydride with one or more mono-ethylenically unsaturated monomers having a molecular weight of up to 1000 is used together with a source of zinc ions, and the resulting mixture has superior corrosion inhibiting properties than similar compositions with other polycarboxylic acids.

Accordingly the present invention provides a composition for treating water which comprises 2.5 to 80% by weight of zinc (calculated as $Zn^{++}$) and from 97.5 to 20% by weight of a hydrolysed copolymer of maleic anhydride with a mono-ethylenically unsaturated monomer or a mixture of monomers, the molar ratio of maleic anhydride to the total of other monomers being from 1:1 to 100:1, the number average molecular weight of the copolymer being up to 1000.

The hydrolysed copolymers used in the present invention are described in British Patent Specification No. 1 414 918.

The molar ratio of maleic anhydride to the total of other monomers is preferably from 2.5:1 to 100:1, more preferably from 2.5:1 to 30:1 and most preferably from 2.5:1 to 7:1. The molecular weight is preferably from 300 to 1000.

The ethylenically unsaturated monomers can be selected from a wide range of compounds, for example, acrylic acid, methacrylic acid, crotonic acid, itaconic acid, aconitic acid, undecylenic acid (and their esters), itaconic anhydride, ethyl acrylate, methyl methacrylate, acrylonitrile, acrylamide, methacrylamide, vinyl acetate, styrene, α-methyl styrene, methyl vinyl ketone, ethylene, propylene, decene, hexadecene, or mixtures thereof.

When mixtures of monomers are used, the resulting polymer may be, e.g. a terpolymer derived from maleic anhydride and two other monomers. Such terpolymers are, for example, those derived from maleic anhydride, vinyl acetate and ethyl acrylate. Other suitable combinations may also be used as shown in the Table below.

Particularly preferred copolymers are those derived from hydrolysed copolymers of maleic anhydride and styrene, acrylic acid and its esters, methacrylic acid and its esters, and vinyl esters of carboxylic acids, e.g. a copolymer formed from maleic anhydride, ethyl acrylate and vinyl acetate.

The copolymers may be prepared by polymerisation in a reactive solvent using a free radical inhitiator such as benzoyl peroxide, ditertiary butyl peroxide or monobutyl hydroperoxide. The polymer then precipitates out of solution.

Examples of the reactive solvents that can be employed include xylene, toluene, ethylbenzene, carbon tetrachloride, chloroform and cumene. Particularly preferred are xylene and toluene.

When a reactive solvent is used it functions as a chain terminator, particularly for the short chain copolymers and forms a minor portion of the polymer molecule. Such end-stopped copolymers may also be termed cotelomers. Examples of copolymer reactants which may be used in the present invention, and suitable reactive solvents which may be used in their preparation are given in the following Table.

TABLE

| Moles of maleic anhydride | Moles of first monomer | Moles of second monomer | Solvent |
| --- | --- | --- | --- |
| 2.5 | 0.5 ethyl acrylate | 0.5 vinyl acetate | toluene |
| 4.0 | 1.0 ethyl acrylate | — | xylene |
| 10.0 | 1.0 ethyl acrylate | — | toluene |
| 4.0 | 1.0 vinyl acetate | — | ethyl benzene |
| 6.0 | 1.0 vinyl acetate | 1.0 ethyl acrylate | xylene |
| 29.0 | 1.0 vinyl acetate | — | toluene |
| 2.5 | 1.0 ethylene | — | toluene |
| 2.5 | 1.0 propylene | — | xylene |
| 3.0 | 0.5 methyl vinyl ketone | 0.5 vinyl acetate | toluene |
| 14.0 | 1.0 methyl vinyl ketone | — | toluene |
| 3.0 | 1.0 methyl methacrylate | — | toluene |
| 6.0 | 1.0 methyl meth- | 1.0 ethyl acrylate | xylene |

TABLE-continued

| Moles of maleic anhydride | Moles of first monomer | Moles of second monomer | Solvent |
|---|---|---|---|
| | acrylate | | |
| 3.0 | 0.5 acrylonitrile | 0.5 vinyl acetate | ethyl benzene |
| 3.0 | 0.5 crotonic acid | 0.5 vinyl acetate | carbon tetrachloride |
| 24.0 | 4.0 styrene | 2.0 ethyl acrylate | carbon tetrachloride |
| 7.0 | 1.0 styrene | — | toluene |
| 4.0 | 1.0 styrene | — | toluene |

The amount of initiator used can be varied over a wide range but depends to some extent on the ratio of monomers. All the co-polymers may be made using up to 20% by weight of initiator based on the weight of monomers, a higher amount only being necessary for those copolymers containing high ratios of maleic anhydride to other monomers e.g. 14:1 upwards, such as 29:1, if a high yield is desired. As the proportion of maleic anhydride is reduced, the amount of initiator may also be reduced without affecting the yield.

The reactants may be mixed in different ways, for example, the initiator may be added to a solution of the monomers, or else a solution of monomers and initiator may be added to a heated solvent.

The final copolymer may be hydrolysed before it is used to treat water. The hydrolysis may be carried out by means of water, an alkali or a mineral acid.

The zinc ion may be added as any of the water soluble salts of zinc, e.g. zinc borate, chloride, nitrate sulphate, or molybdate.

Preferably the composition of the invention comprises from 10 to 60% by weight of zinc and from 90 to 40% by weight of the hydrolysed copolymer.

The present invention also provides a process for inhibiting the corrosion and scale forming tendencies of water or an aqueous system which comprises treating the water or aqueous system with from 0.1 to 500 ppm, preferably 1 to 200 ppm of a composition as described above.

The composition of the invention may be used in conjunction with other conventional water-treatment additives as desired. Specifically the composition may be used with other common inhibitors for example those used for protection of copper such as benzotriazole, tolutriazole, and 5,5'-methylene-bis-benzotriazole or copper-deactivating derivatives of these compounds; or a silicate to control attack on aluminium. In addition there may also be added other corrosion inhibitors for ferrous metals known per se, e.g. chromium derivatives, nitrite ions, amines, such as cyclohexylamine, morpholine, distearylamine/ethylene oxide condensation products and stearylamino, sodium sulphate and magnesium sulphate.

Other water treatment compounds well known in the art may also be used.

Dispersing and/or threshold agents may be used, such as for example polyacrylic acid and its salts, hydrolysed polyacrylonitrile, polymethacrylic acid and its salts, polyacrylamide and co-polymers thereof from acrylic and methacrylic acids, lignin sulphonic acid and its salts, tannin, naphthalene sulphonic acid/formaldehyde condensation products, starch and its derivatives, and cellulose derivatives, e.g. carboxymethyl cellulose, acrylic acid/lower alkyl hydroxy acrylate copolymers such as those described in U.S. Patent Specification No. 4029577, sulphonated styrene/maleic anhydride copolymers and sulphonated styrene homopolymers such as those described in U.S. Patent Specification No. 4 374 733 and combinations thereof.

Specific threshold agents such as for example, polymaleic acid and its salts, alkyl phosphonic acids, 1-aminoalkyl 1,1-diphosphonic acids and their salts and alkali metal phosphates, may also be used.

Precipitating agents may also be used such as alkali metal orthophosphates, carbonates and hydroxides, oxygen scavengers such as alkali metal sulphites and hydrazine and sequestering agents such as nitrilotriacetic acid, ethylene diamine tetraacetic acid and their salts.

Antifoaming agents such as distearyl sebacamide, distearyl adipamide and related products derived from ethylene oxide condensations, in addition to fatty alcohols and their ethylene oxide condensates, may also be used.

A general method was used to prepare the copolymers of the following Examples.

POLYMERISATION STAGE

A solution of 98 parts by weight of maleic anhydride in 100 parts by weight, by weight of xylene is heated at reflux (144° C.). To this solution is added dropwise over a period of 2 hours a mixed solution of the comonomer(s) and di-t-butyl peroxide (1.3% based on the total monomers) in 40 parts by weight of xylene. On the completion of this addition the reaction mixture is heated for a further 2 hours at reflux, then cooled to 95° C.

HYDROLYSIS STAGE 170 parts by weight water are added dropwise over a period of 30 minutes. The resulting mixture is stirred at 95° C. for a sufficient period of time to ensure that all the copolymer is dissolved, (usually 1 hour), then cooled to 30° C. The resulting mixture is transferred to a separating funnel and the aqueous layer separated.

An accurate quantity of the resulting solution is weighed into an evaporating dish and dried at 105° C. to constant weight to determine the active ingredient content.

If a sample of the copolymer is required in the anhydride form the following procedure can be adopted. On the completion of the polymerisation stage the reaction mixture is cooled to 30° C. and the upper xylene layer removed by decantation. The copolymer is dissolved in 50 parts by weight of methyl ethyl ketone and re-precipitated by addition of the solution to 1,000 parts by weight of stirred toluene. The resulting slurry is filtered and the copolymer washed with 2×200 parts by weight n-hexane and finally dried to constant weight under vacuum at 40° C.

The copolymers in the anhydride form can be hydrolysed by boiling with water for 1 hour to convert the anhydride groups to carboxylic acid groups.

The copolymers containing hydrolysable comonomers e.g. vinyl acetate, acrylonitrile, acrylamide, ethyl acrylate, may be hydrolysed further by refluxing a mixture of the polymer in the anhydride form with the equivalent amount of alkali or acid solution or by replacing the water used in the hydrolysis stage with the equivalent amount of alkali or acid solution.

The invention is illustrated by the following Examples.

EXAMPLES 1-3

Laboratory tests are carried out using a Laboratory Heat Exchanger Rig, a form of laboratory testing intended to simulate practical use conditions. In this rig water is aerated and circulated over a number of metal coupons, and passed over a heated mild steel heat exchanger tube. After a suitable test period, the metal coupons and heat exchanger tube are examined and the corrosion rates determined.

In detail the rig consists of a closed loop, non-evaporative recirculating water circuit made up of the following:

20 liter reservoir
flow meter
coupon chamber
heat exchanger
pump
flow control valve.

The 20 liters of test water in the reservoir is aerated with compressed air introduced through a sintered disc at 500 ml per minute.

From this reservoir it is pumped over the heat exchanger, through the flow meter and coupon chamber and back into the 20 liter reservoir.

A flow rate of 4 liters per minute provides a velocity of 0.3 meters per second over the heat exchanger. The heat exchanged is set such as to give a reservoir water temperature of 40° C.

Metal test coupons are scrubbed with pumice and then immersed in acid as follows:

| Metal | Acid |
| --- | --- |
| Mild steel | Conc. HCl. diluted 1:1 with water at room temperature for 1 minute. |
| Copper | Conc. HCl. diluted 1:1 with water at room temperature for 1 minute. |
| Brass | Conc. HCl. diluted 1:1 with water at room temperature for 1 minute. |
| Aluminium | Conc. HNO$_3$ for 30 minutes. |

After such immersion the coupons are rinsed with water, dried and weighed; they are then mounted on a Perspex jig, care being taken that none of the coupons touch each other, and they are insulated from the bolt holding the jig together. The mild steel heat exchanger tube is cleaned with pumice, dipped in conc. hydrochloric acid diluted 1:1 with water, and then rinsed with water, dried and weighed. The rig is assembled, and cleaned thoroughly by circulating conc. hydrochloric acid diluted 1:1 with water, then flushing with water for 3 hours and draining. The necessary quantity of additives to produce the desired passivation concentration is put into the rig and the rig is filled with 20 liters of a test water, which are characterised as follows:

|  | water A | water B |  |
| --- | --- | --- | --- |
| pH | 7.0 | 7.6 |  |
| Phenol alkalinity | 0 | 0 |  |
| Total alkalinity | 40 | 280 | as p.p.m. |
| Total Hardness | 40 | 290 | CaCO$_3$ |
| Chlorides | 12 | 50 | p.p.m. |

The pump and heater are started and after three days operation the rig is stopped, and water drained and a lower, maintenance dose of additives added to a fresh 20 liters of water. The rig is then restarted. After a further ten days the rig is drained. The coupons are removed and cleaned as before except that the conc. HCl diluted 1:1 with water is inhibited with 1% hexamine (i.e. hexamethylene tetramine). The are then rinsed with water, dried and reweighed.

The heat exchanger is removed cleaned with scrubbing and dipped in conc. HCl diluted 1:1 with water inhibited with 1% hexamine, rinsed with water, dried and reweighed.

All additives were tested in the rig at a concentration of 50 ppm organic plus 12 ppm Zn$^{2+}$ plus 2 ppm benzotriazole for 3 days then 10 ppm organic plus 2.5 ppm Zn$^{2+}$ plus 2 ppm benzotriazole.

In each case the Zn$^{2+}$ was added as zinc nitrate hexahydrate. The organic compounds used are given in Table 1.

TABLE 1

| Example | Organic |
| --- | --- |
| A | None |
| 1. | Hydrolysed telomer from 4 moles Maleic anhydride: 1 mole styrene |
| 2. | Hydrolysed telomer from 7 moles Maleic anhydride: 1 mole styrene |
| 3. | Hydrolysed telomer from 6 moles Maleic anhydride: 1 mole vinyl acetate: 1 mole ethyl acrylate |
| 4. | Hydrolysed telomer from 24 moles Maleic anhydride: 4 moles styrene: 2 moles ethyl acrylate |
| 5 | Hydrolysed telomer from 3 moles Maleic anhydride: 1 mole styrene |
| 6 | Hydrolysed telomer from 5 moles Maleic anhydride: 1 mole styrene |

The results are shown in Tables 2 and 3.

TABLE 2

Corrosion rate of metal mg. per sq. decimeter per day (mdd) using test water A.

| Example | Mild Steel Coupons | Mild Steel Heat Exchanger |
| --- | --- | --- |
| A | 105.00 | 108.80 |
| 1 | 19.7 | 23.10 |
| 4 | 7.8 | 21.2 |

TABLE 3

Corrosion rate of metals mg. per sq decimeter per day (mdd) using test water B

| Example | Mild Steel Coupons | Mild Steel Heat Exchanger |
| --- | --- | --- |
| A | 72.4 | 79.5 |
| 1 | 11.6 | 14.7 |
| 2 | 2.9 | 13.46 |
| 3 | 5.4 | 14.7 |
| 5 | 6.2 | 17.3 |
| 6 | 5.7 | 18.6 |

The copper, brass and aluminium samples showed that the composition of the invention have no adverse effect on benzotriazole.

We claim:

1. A composition for treating water or an aqueous system which comprises 2.5 to 80% by weight of zinc (calculated as Zn++) and from 97.5 to 20% by weight of a hydrolysed copolymer of maleic anhydride with a monoethylenically unsaturated monomer or a mixture of monomers, the molar ratio of maleic anhydride to the total of other monomers being from 1:1 to 100:1, the number average molecular weight of the copolymer being up to 1000.

2. A composition as claimed in claim 1 which comprises from 10 to 60% by weight of zinc and from 90 to 40% by weight of the hydrolysed copolymer.

3. A composition as claimed in claim 1 in which the molar ratio of maleic anhydride to the total of the other monomers is from 2.5:1 to 100:1.

4. A composition as claimed in claim 3 in which the ratio of maleic anhydride to the total of the other monomers is from 2.5:1 to 7:1.

5. A composition as claimed in claim 1 in which the copolymer is formed from maleic anhydride and styrene.

6. A composition as claimed in claim 1 in which the copolymer is formed from maleic anhydride, ethyl acrylate and vinyl acetate.

7. A composition as claimed in claim 1 in which the copolymer has a molecular weight of from 300 to 1000.

* * * * *